Sept. 15, 1970 SUSUMU KAWASE ET AL 3,529,087

AUTOMATIC LINE RELEASING APPARATUS

Filed May 29, 1967

2 Sheets-Sheet 1

INVENTORS.
SUSUMU KAWASE
KATSUHIKO MORI

By Wallace, Kinzer & Dorn
Attys.

INVENTORS.
SUSUMU KAWASE
KATSUHIKO MORI
By Wallace, Kinzer & Dorn
ATTYS

United States Patent Office 3,529,087

Patented Sept. 15, 1970

3,529,087

AUTOMATIC LINE RELEASING APPARATUS

Susumu Kawase and Katsuhiko Mori, Tokyo, Japan, assignors to Nippon Electric Company Limited, Tokyo-to, Japan, a corporation of Japan Filed May 29, 1967, Ser. No. 642,072
Claims priority, application Japan, May 28, 1966, 41/34,171
Int. Cl. H04m *11/08*
U.S. Cl. 179—2 2 Claims

ABSTRACT OF THE DISCLOSURE

An automatic line release appartus for a graphic recording communication system of the kind including a remote graphic communication receiver connected through a transmission line to a switch board and actuated by two frequency-modulated coordinate signals. The release apparatus includes a D.C. loop circuit that is connected to the transmission line and that is actuatable from an open condition to a closed condition. A ring signal received closes the D.C. loop circuit upon receipt of an A.C. ring signal from the switchboard, the ring signal receiver including a time delay circuit actuating a relay. A time limiting circuit comprising a normally-energized relay is connected to the graphic communication receiver and to the D.C. loop circuit; the relay is de-energized to open the D.C. loop circuit whenever the receiver does not develop one coordinate signal within a predetermined time interval following initiation of a call, thereby restoring the system to condition for receipt of another call. An answering signal, including an oscillator and a timing relay, circuit is coupled to the D.C. loop circuit to generate an answering signal of predetermined duration each time the D.C. loop circuit is closed. The answering signal circuit is interconnected with the time limiting circuit so that the time limiting circuit begins its operation following termination of the answering signal. An on-hook detector is also provided to open the D.C. loop circuit under certain coordinate signal conditions.

BACKGROUND OF THE INVENTION

When a remote graphic communication recording receiver is connected in a transmission circuit network of the kind including an automatic telephone switchboard, it is frequently desirable to provide for operation of the receiver in response to dialing from a remote location. Furthermore, it is often necessary or desirable that the receiver at the terminal station operate automatically without requiring the presence of an attendant. To accomplish this end, the remote graphic receiver should be automatically connected to the transmission line from the automatic telephone switchboard or comparable portion of the system in response to reception of a ring signal from the switchboard. Moreover, the complete operation of the receiver should be controllable in response to the data or control signals from the calling station.

In a system of this kind, the complete communication network usually includes many stations utilized only for speech communication through conventional telephone instruments that are not suitable for sending or receiving graphic communication data. It follows, therefore, that the unattended terminal station including a graphic recording receiver might be set into operation by a ring signal originated from the switchboard as a result of dialing at a station that does not include a graphic communication transmitter or transceiver. That is, an erroneous dialing operation, or an error in the functioning of the switchboard, may connect an ordinary voice telephone to the graphic communication receiver. In this instance, the terminal station with the graphic communication receiver may establish a complete D.C. loop with respect to the switchboard and may hold the line indefinitely even though no usable information is being transmitted. The transmission line to the graphic receiver remains engaged and the receiver is effectively rendered inoperable since it is incapable of receiving any call initiated by a subsequent ring signal dialed at another station.

SUMMARY OF THE INVENTION

It is an object of the present invention to provide an improved automatic line apparatus for a terminal station comprising a remote graphic communication receiver which prevents the circuit to the receiver from being kept engaged and incapable of receiving a specification message in those instances in which no communication is in fact performed. A related object of the invention is to provide an automatic line release apparatus for a graphic recording receiver which functions effectively whether the failure of communication is caused by the reception of a call from a station which does not include a graphic communication transmitter or transceiver or is the result of an operating error at a calling station. The invention is most frequently used in connection with graphic communication receivers which utilize two frequency modulated coordinate signals of different fundamental frequencies, usually identified as an ordinate signal and as an abscissa signal.

An automatic line release apparatus constructed in accordance with the present invention comprises a D.C. loop circuit connected to the transmission line and actuatable from an open condition to a closed condition; actuation of the D.C. loop circuit is effected by an actuating means that is rendered operative upon initiation of a call on the transmission line to the graphic communication receiver. A time limiting circuit means is connected to the graphic communication receiver and to the D.C. loop circuit and is employed to open the D.C. loop circuit whenever a graphic information signal usable by the receiver is not received within a predetermined time interval following initiation of a call, thereby restoring the receiver to a condition ready for reception of another call. In the preferred construction described hereinafter, an answering signal circuit is coupled to the D.C. loop circuit and is employed to develop an answering signal of predetermined duration each time the D.C. loop circuit is closed, this signal being supplied to the transmission line. The answering signal circuit is preferably interconnected with the time limiting circuit means so that the latter begins its operation upon termination of the answering signal. Preferably, an on-hook detector is also incorporated in the automatic line release apparatus.

DESCRIPTION OF THE PREFERRED EMBODIMENTS

Figure 1:
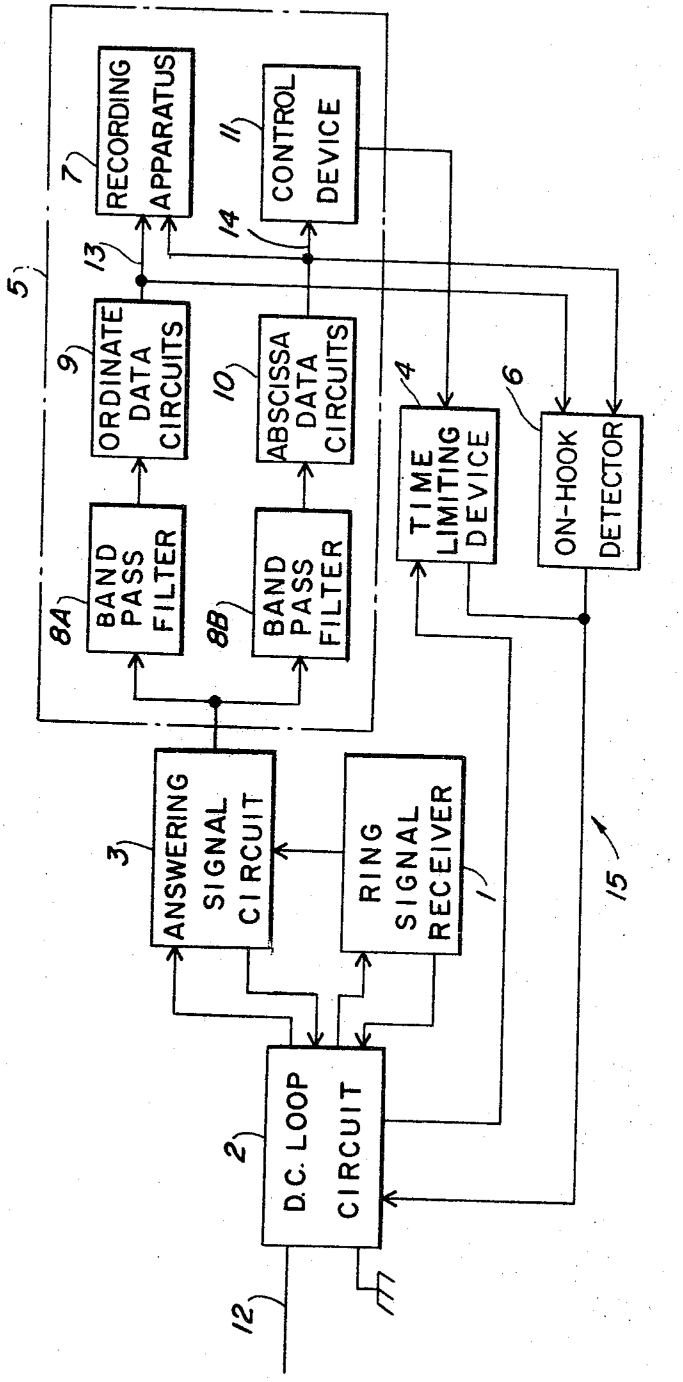
FIG. 1 is a block diagram of an automatic line release apparatus for a graphic telecommunication receiver constructed in accordance with one embodiment of the invention.

The block diagram of FIG. 1 illustrates one embodiment of an automatic line release apparatus 15 for use with a remote graphic telecommunication receiver 5 that is connected through a transmission line 12 to an automatic telephone system switchboard (not shown). In the automatic line release apparatus 15, a ring signal receiver 1 is connected to a D.C. loop circuit 2 that is electrically connected to the transmission line 12. That is, the D.C. loop circuit 2 is connected to the ring signal receiver 1 to actuate the receiver and the ring signal receiver is in turn connected back to the D.C. loop circuit 2 to control its operation as described in detail hereinafter.

The automatic line release apparatus 15 further includes an answering signal circuit 3 that can be connected to the transmission line 12 through the D.C. loop circuit 2. The answering signal circuit 3 is also controlled by the ring signal receiver 1. It is also connected back to the D.C. loop circuit 2 to control the operating condition of the D.C. loop circuit.

The answering signal circuit 3 connects the transmission line 12 to a graphic telecommunication receiver 5. The receiver 5, as shown in FIG. 1, is of generally conventional construction, and utilizes two frequency-modulated coordinate data signals to control a graphic recording apparatus 7. The receiver 5 includes a first band pass filter 8A having an input connected to the answering signal circuit 3 and an output connected to an ordinate data circuit unit 9. The receiver 5 further includes a second band pass filter 8B having an output coupled to an abscissa data circuit unit 10. The coordinate signal outputs 13 and 14 of circuits 9 and 10 are connected to a recording apparatus 7.

The coordinate signal outputs from circuits 9 and 10 need not necessarily constitute linear coordinate signals; they may constitute curvi-linear coordinate signals, as frequently used in commercially available receivers of this kind, or other coordinate signals. Furthermore, the term "receiver" as used throughout this specification and in the appended claims is intended to refer both to devices which constitute only receivers and to the receiver circuits of transceiver units.

The output of one of the coordinate data circuits 9 and 10, in this instance the output 14 of the abscissa data circuit 10, is connected to a control device 11. The control device 11, in turn, actuates a time limiting circuit 4. The time limiting device 4 is provided with a second input from the D.C. loop circuit 2. The time limiting device 4 is electrically connected back to the D.C. loop circuit 2 to control the operation of that circuit as described hereinafter.

The automatic line release apparatus 15 further includes an on-hook detector 6. Detector 6 is provided with two inputs, one from each of the coordinate data circuits 9 and 10. The on-hook detector 6 is also connected back to the D.C. loop circuit 2 to control the operation of that circuit.

In considering the operation of the automatic line release apparatus of FIG. 1, it may first be assumed that a conventional ring signal is received on transmission line 12 and is applied to the D.C. loop circuit 2. The ring signal is supplied to the ring signal receiver 1, which operates to close circuit 2 and completes a D.C. loop, through transmission line 12, to the remote switchboard (not shown). The ring signal receiver 1 also operates to condition the answering signal circuit 3 for subsequent operation.

When the received ring signal terminates, the answering signal circuit 3 is actuated for a predetermined time interval to transmit an answering signal to the calling station over the transmission line 12. In this manner, the calling station is informed that the receiving station of FIG. 1 is prepared for the reception of graphic data signals.

The initial actuation of the D.C. loop circuit 2 is also dependent upon the operating condition of the time limiting device 4, which is initially conditioned to permit closing of the D.C. loop within circuit 2. Upon completion of the operations described above, in which the D.C. loop circuit 2 is closed and an answering signal is sent out from the circuit 3, the time limiting circuit 4 holds the D.C. loop circuit 2 in its closed condition for a preset time interval.

Upon completion of the transmission of the answering signal from circuit 3, the transmission line 12 is effectively connected to the graphic communication receiver 5. In the receiver 5, the transmitted signal from the calling station is divided, on the basis of frequency, by the band pass filters 8A and 8B. The filter 8A produces an ordinate data signal that is supplied to the ordinate data circuits 9. The band pass filter 8B develops an abscissa data signal that is supplied to the circuit 10. These input signals are processed by the coordinate circuits 9 and 10 to produce graphic information control signals that are supplied to the recording apparatus 7 to control the operation of the recording apparatus. The respective outputs 13 and 14 of the ordinate data circuit 9 and the abscissa data circuit 10 afford relatively constant output voltages which vary only to a limited extent with changes in frequency of the information signal, so long as the input amplitude exceeds a predetermined value.

The control device 11 is actuated by the output voltage from the circuit 14 that connects the abscissa data unit 10 to the control device. Upon actuation of the control device 11, the time limiting device 4 that is connected to the control device 11 is conditioned to maintain the D.C. loop circuit 2 in closed condition. The time limiting circuit 4 prevents the D.C. loop circuit 2 from being opened due to a momentary interruption of an information signal. On the other hand, if the time limiting device 4 is not actuated by the control device 11 within a predetermined time after completion of the answering signal from circuit 3, then the time limiting device 4 opens the D.C. loop circuit 2, thereby conditioning the receiving station for operation in response to a subsequent ring signal on the transmission line 12.

The on-hook detector circuit 6 is utilized in systems in which the presence of one of the two information signal frequencies in the absence of the other (e.g., an ordinate data signal without an abscissa data signal) is used as an on-hook signal. The on-hook signal condition is detected by the circuit 6, which actuates the D.C. loop circuit 2 to its open condition and terminates the signal reception operation.

In the embodiment of the invention illustrated in FIG. 1, the ring signal receiver 1 is actuated by the ring signal from the transmission line 12, the D.C. loop circuit 2 is closed, and the answering signal circuit 3 sends the required answering signal to the calling station back along line 12. In those instances in which an information signal is not received within a preset time interval after the answering signal has been completed, the time limiting device 4 does not receive the necessary actuating signal from the control device 11. Under these circumstances, the D.C. loop circuit 2 opens and releases the line from the switchboard (not shown). The terminal station is thus restored to a condition ready to receive a further ring signal.

Figure 2:
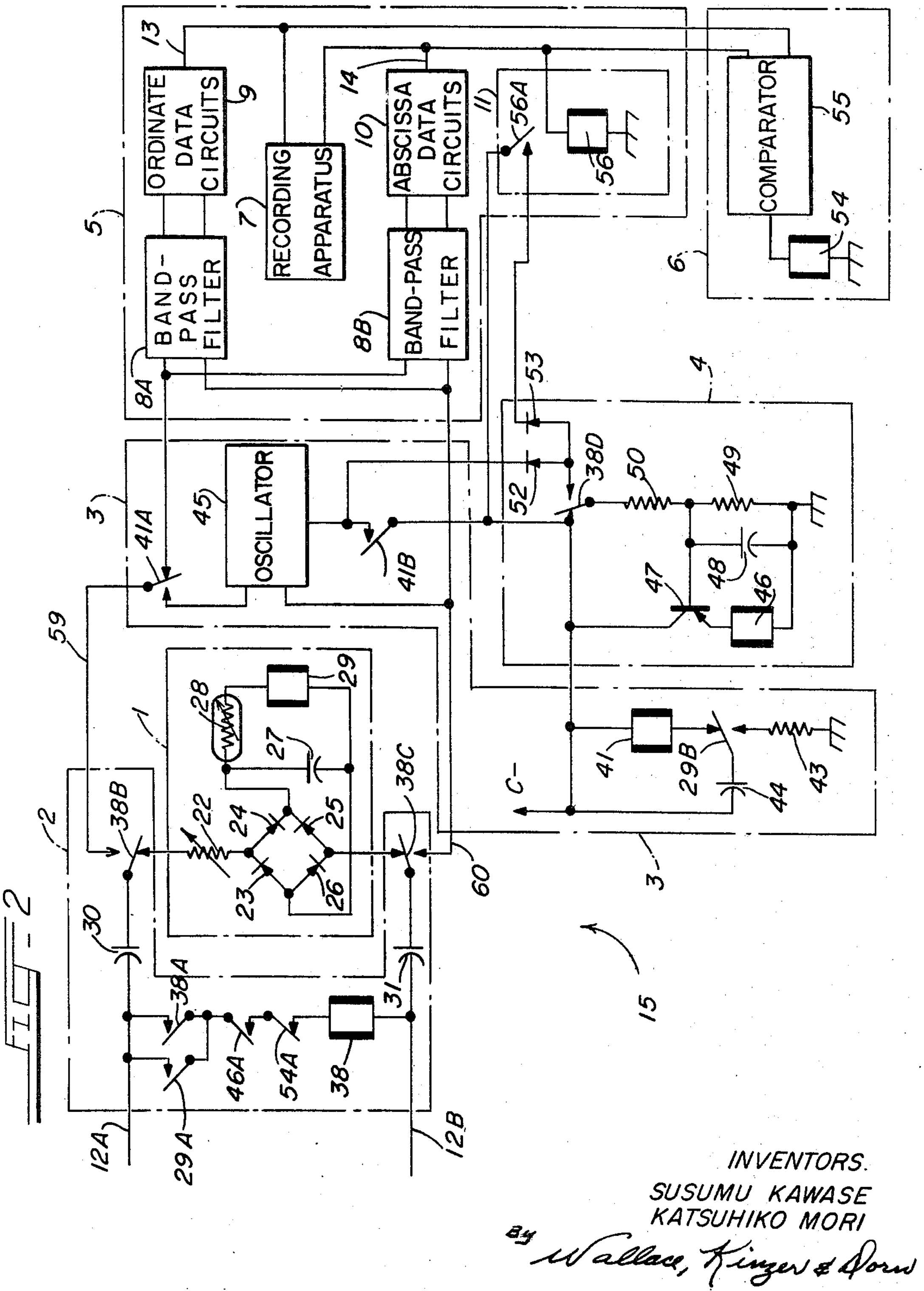
FIG. 2 is a schematic circuit diagram, partially in block form, of one specific construction for the automatic line releasing apparatus of FIG. 1.

Specific examples for the ring signal receiver 1, the D.C. loop circuit 2, the answering signal circuit 3, the time limiting device 4, and the control device 11 are shown in the schematic diagram of FIG. 2. In the construction illustrated in FIG. 2, one conductor 12A of the transmission line 12 is coupled through a capacitor 30 to the normally closed side of a set of relay contacts 38B that are included in the D.C. loop circuit 2. In FIG. 2, and in the following description, the contacts for each relay are identified by the same reference numeral as the relay coil but with the addition of a letter suffix. The second conductor 12B of the transmission line 12 is similarly coupled through a capacitor 31 to the normally closed side of a set of relay contacts 38C.

The ring signal receiver 1, in the embodiment of FIG. 2, comprises an adjustable resistor 22 that is connected from the normaly closed side of the relay contacts 38B to one input terminal of a bridge rectifier comprising four diodes 23, 24, 25 and 26. The other input terminal of the rectifier bridge is returned to the normally closed side of the relay contacts 38C. One of the output terminals of the bridge is connected to a thermistor 28, which in turn is connected to a relay coil 29 that is returned to the other output terminal of the bridge. A capacitor 27 is connected across the series combination of the thermistor 28 and the relay coil 29.

The D.C. loop circuit 2, in the construction shown in FIG. 2, comprises a relay coil 38 having one terminal connected directly to the transmission line conductor 12B. The other terminal of the relay coil 38 is connected through a pair of normally closed relay contacts 54A, a pair of normally open relay contacts 46A, and a pair of normally open relay contacts 29A, in series, to the remaining transmission line conductor 12A. The relay 38 is provided with a set of normally-open contacts 38A connected in parallel with the contacts 29A.

The answering signal circuit 3, in FIG. 2, includes a relay coil 41 having one terminal connected directly to an appropriate D.C. supply designated as C—. The other terminal of relay coil 41 is connected to the normally closed side of a set of relay contacts 29B. The movable contact 29B is connected to a capacitor 44 that is returned to the C— supply. The normally open contact of set 29B is connected to a resistor 43 which is returned to system ground.

The answering signal circuit 3 further includes an oscillator 45. The oscillator 45 has two output circuit connections, one of which is connected to the normally open contact of a set of relay contacts 41A, the movable contact of set 41A being connected to a conductor 59 that connects back to the normally open side of contacts 38B. The other output connection for oscillator 45 is the conductor 60 which is connected to the normally open side of the contacts 38C. The energizing circuit for the oscillator 45 includes a pair of normally open relay contacts 41B that connect the oscillator to the C— supply.

In the circuit of FIG. 2, the time limting circuit 4 is illustrated as including a PNP transistor 47 having its collector electrode connected to the C— supply. The emitter electrode of the transistor 47 is connected to one terminal of a relay operating coil 46, the other terminal of the coil being returned to system ground. The base electrode of the transistor 47 is connected to a capacitor 48 that is returned to ground. A resistor 49 is connected in parallel with the capacitor 48. The base electrode of the transistor 47 is also connected to a resistor 50 connected to the movable contact of a set of relay contacts 38D. The normally closed side of the relay contacts 38D is connected to the C— supply. A diode 52 connects the normally open side of the relay contacts 38D to the energizing circuit of the oscillator 45 in the answering signal circuit 3.

The on-hook signal detector 6, in the embodiment of FIG. 2, comprises a voltage comparator circuit 55 that is connected to the outputs 13 and 14 of the two coordinate data circuits 9 and 10 in the graphic recording receiver 5. The comparator 55 is connected to a relay operating coil 54.

The control device 11 of the reciever 5, as shown in FIG. 2, comprises a relay having an operating coil 56 that is connected to the abscissa data circuit 10. The relay 56 includes a pair of normally open contacts 56A. One of the contacts 56A is connected back to the C— supply. The other of the contacts 56A is connected through a diode 53 to the normally open side of the relay contacts 38D in the time delay circuit 4.

In considering the operation of the circuits in FIG. 2, it should first be noted that the transistor 47 is normally biased to conductive condition through the circuit connections of the collector and the base to the C— supply. Accordingly, the relay operating coil 46 is maintained energized. With the coil 46 energized, the relay contact 46A in the D.C. loop circuit 2 are held closed.

The usual ringing signal employed in telephone circuits of the kind with which the present invention is used comprise relatively low frequency A.C. signals. Typically, a ring signal of sixteen cycles per second may be employed. The incoming ring signal is supplied to the bridge rectifier 23–26 through the coupling capacitors 30 and 31 and the relay contacts 38B and 38C. The adjustable resistor 22, the capacitor 27, and the thermistor 28 comprise a delay circuit for delaying energization of the relay operating coil 29. The momentary delay afforded by this circuit prevents premature operation of the ring signal receiver 1 in response to transient signals or to an incomplete and erroneous ring signal.

The rectified ring signal supplied to coil 29 actuates the relay, closing the contacts 29A in the D.C. loop circuit 2. Since the contacts 46A in circuit 2 are already closed, as described above, the closing of the contacts 29A completes a D.C. circuit between the transmission line conductors 12A and 12B. The completion of the D.C. loop circuit energizes the relay operating coil 38 by a D.C. current from the remote switchboard (not shown) that is connected to the transmission line conductors 12A and 12B. Energization of the relay 38 closes the contacts 38A to maintain the D.C. loop circuit in closed condition when the contacts 29A open, as described hereinafter. Moreover, energization of the relay 38 actuates its contacts 38B and 38C to their alternate positions, de-energizing the relay operating coil 29. Consequently, the relay 29 drops out.

While the relay 29 remains actuated in response to the ring signal, its contacts 29B in the answering signal circuit 3 are actuated from the position illustrated in FIG. 2 to the alternate position for these contacts. Consequently, while the relay 29 remains energized, the capacitor 44 is charged through the resistor 43, by virtue of the connection of the capacitor to the C— supply.

When the relay 29 drops out, as described above, the contacts 29B return to the position illustrated in FIG. 2, completing an energizing circuit for the relay operating coil 41. That is, coil 41 is energized by the discharge of the capacitor 44. The relay coil 41 remains energized for a limited time interval determined by the time constant of the RC circuit comprising the capacitor 44 and the resistance of the coil 41.

During the time interval in which the relay 41 is actuated, the contacts 41A are actuated to connect the one output terminal of the oscillator 45 to the conductor 59 that is in turn connected to the transmission line 12A through the relay contacts 38B and the coupling capacitor 30. Moreover, contacts 41B close to afford an energizing circuit for the oscillator 45. Energization of the oscillator 45 develops an answering signal that is transmitted to the line 12A, 12B through the conductors 59 and 60 and capacitors 30 and 31. When the relay 41 drops out automatically, as described above, the contacts 41A return to their original operating position, disconnecting the output of the oscillator from the transmission line. Furthermore, contacts 41B open to de-energize the oscillator circuit and thus interrupt the answering signal transmission.

At the beginning of the answering signal cycle, when the relay coil 38 is energized, the relay contacts 38D in the time delay circuit 4 are switched to their alternate position, disconnecting the resistor 50 from the C— source and connecting the resistor to the diodes 52 and 53. In this condition, when the relay 41 is energized as described above, and contact 41B closes to energize the answering signal oscillator 45, the resistor 50 is again connected to the C— supply through the diode 52. Consequently, the transistor 47 is maintained conductive and the relay coil 46 is held in energized condition.

Subsequently, when the answering signal circuit relay 41 drops out, as described above, and the contacts 41B open, the bias resistor 50 is disconnected from the power supply C—. When this occurs, the capacitor 48 begins to discharge through the base-emitter circuit of the transistor 47. Initially, the voltage between the emitter of the transistor 47 and system ground, which is the voltage applied to the relay coil 46, is nearly equal to the voltage across the capacitor 48. Consequently, the relay 46 is held energized until the voltage on the capacitor 48 falls below the release voltage of the relay, due to the continuing discharge of the capacitor. The circuit parameters for the time delay circuit 4 are selected to afford a holding time for the relay 46 that is long enough to permit an operator at a calling station to confirm the receipt of the answering signal and to initiate transmission of an information signal to be used by the graphic recording receiver 5. The holding time for the time limiting circuit 4 should not be set too long; otherwise, the effectiveness of this circuit in utilization of the operating circuit from the switchboard and of the graphic communication receiver 5 may be unduly lowered.

Whenever an information signal is received, and the relay 46 remains energized, the control relay 56 of the control device 11 is energized. When this occurs, relay contacts 56A close. This completes an operating circuit from the C— supply to the bias resistor 50, through the relay contacts 56A, diode 53 and relay contacts 38D, charging the capacitor 48 and maintaining the transistor 47 in conductive condition.

In any instance in which an information signal is not received before the voltage across the capacitor 48 drops below the release voltage for the relay 46, the relay 46 is effectively de-energized and drops out. When this occurs, the relay contacts 46A in the D.C. loop circuit 2 open. This opens the D.C. loop circuit and de-energizes the coil 38. The opening of the D.C. loop circuit releases the switching circuit from the terminating station to the switchboard. The release of the relay 38 also re-conditions the complete circuit for receipt of a subsequent ring and message. It will be recognized that the control device 11, and particularly the relay 56, serves to maintain the circuit in condition for receiving an information signal as long as there is no gap in the information signal that exceeds the delay time of the time limiting circuit 4.

The potential on the output line 14 from the abscissa data circuit 10 is not dependent upon frequency variations in the signal from the abscissa data circuit. A substantially constant output is obtained in all cases in which the information signal is present; at least, a sufficient voltage is developed to energize the relay coil 56 at a level adequate to actuate the relay. Thus, the time limiting device 4 cannot interrupt the reception of data by the receiver 5 as long as there is no substantial break in the received information signal.

As noted above, the on-hook detector circuit 6 includes a comparator 55 that compares the potential difference between the output signals from the coordinate data circuits 9 and 10 as developed on the output circuits 13 and 14. When the potential difference exceeds a predetermined value, indicative of substantially complete absence of one of the coordinate signals while the other is present, the relay coil 54 is energized, actuating the relay to open the normally closed contacts 54A in the D.C. loop circuit 2. The over-all effect is essentially the same as described above with respect to de-energization of the relay coil 46 in the time limiting circuit 4. That is, the opening of the contacts 54A breaks the D.C. loop circuit 2 and de-energizes the relay 38 to restore the release apparatus 15 to its original operating condition ready to receive a subsequent message.

The automatic line release circuits of the present invention make it possible to prevent a transmission line from a switchboard from being held engaged due to the reception of a call from a station that does not or cannot transmit an appropriate information signal to the graphic communication receiver 5. By the same token, the invention prevents the line from being held engaged as the result of an erroneous call from a calling station that is not followed up by an appropriate information signal. It thus makes possible effective and efficient utilization of a graphic communication receiver, such as the receiver 5, in conjunction with an automatic switchboard and other conventional telephone transmission facilities.

We claim:

1. An automatic line release apparatus for a graphic communication system including a remote graphic communication receiver connected through a transmission line to a switchboard, comprising:

a D.C. loop circuit, connected to said transmission line, and actuatable from an open condition to a closed condition;

actuating means for actuating said D.C. loop circuit to its closed condition upon initiation of a call from said switchboard on said line;

time limiting circuit means, connected to said receiver and to said D.C. loop circuit, for opening said D.C. loop circuit whenever a graphic information signal usable by said receiver is not received within a predetermined time interval following initiation of a call, restoring said system to condition in which said receiver is ready to receive another call; and an answering signal circuit, coupled to said D.C. loop circuit, for generating and supplying to said transmission line an answering signal of predetermined duration each time said D.C. loop circuit is closed, said answering signal circuit being inter-connected with said time limiting circuit means for initiating operation of said time limiting circuit means upon termination of said answering signal.

2. An automatic line release apparatus for a graphic communication system including a remote graphic communication receiver, of the kind utilizing two received coordinate control signals, connected through a transmission line to a switchboard, comprising:

a D.C. loop circuit, connected to said transmission line, and actuatable from an open condition to a closed condition;

actuating means for actuating said D.C. loop circuit to its closed condition upon initiation of a call from said switchboard on said line;

time limiting circuit means, connected to said receiver and to said D.C. loop circuit, for opening said D.C. loop circuit whenever a graphic information signal usable by said receiver is not received within a predetermined time interval following initiation of a call, restoring said system to condition in which said receiver is ready to receive another call; and an on-hook detector coupled to said receiver and to said D.C. loop circuit for opening said D.C. loop circuit in response to a predetermined amplitude differential between said two co-ordinate signals.

References Cited

UNITED STATES PATENTS

| | | | |
|---|---|---|---|
| 2,843,660 | 7/1958 | Franklin | 178—5.6 |
| 3,301,957 | 1/1967 | Germond | 179—3 |

RALPH D. BLAKESLEE, Primary Examiner

U.S. Cl. X.R.

178—5.6